3 Sheets--Sheet 1.

J. V. WOOLSEY.
Machines for Sawing Spokes.

No. 134,184.  Patented Dec. 24, 1872.

Fig. I.

Witnesses.
C. Carr,
A. F. Cornell.

Inventor.
J. V. Woolsey.
Per Burridge & C.
Atty's.

3 Sheets--Sheet 2.

J. V. WOOLSEY.

Machines for Sawing Spokes.

No. 134,184.  Patented Dec. 24, 1872.

Witnesses.
C. Carr.
A. F. Cornell.

Inventor.
J. V. Woolsey.
Per Burridge & Co.
Attys.

3 Sheets--Sheet 3.

J. V. WOOLSEY.
Machines for Sawing Spokes.

No. 134,184. Patented Dec. 24, 1872.

Witnesses.
C. Carr,
A. F. Cornell.

Inventor.
J. V. Woolsey.
Per. Burridge & Co.
Attys.

UNITED STATES PATENT OFFICE.

JOHNSTON V. WOOLSEY, OF SANDUSKY, OHIO.

IMPROVEMENT IN MACHINES FOR SAWING SPOKES.

Specification forming part of Letters Patent No. 134,184, dated December 24, 1872.

*To all whom it may concern:*

Be it known that I, J. V. WOOLSEY, of Sandusky, in the county of Erie and State of Ohio, have invented a certain new Improvement in Machines for Sawing Spokes; and I do hereby declare that the following is a full, clear, and complete description thereof, reference being had to the accompanying drawing making part of the same.

Figure 1:
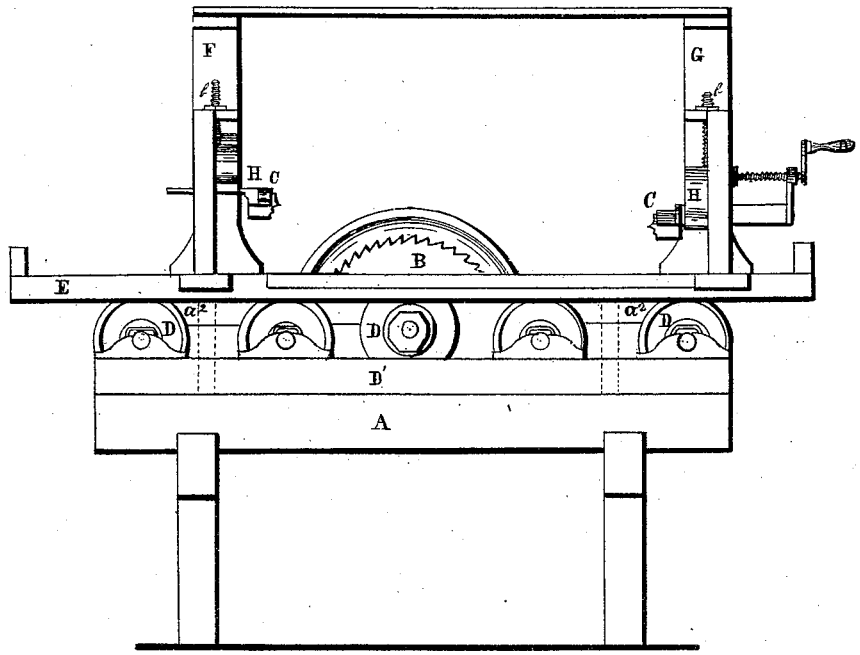
Figure 2:
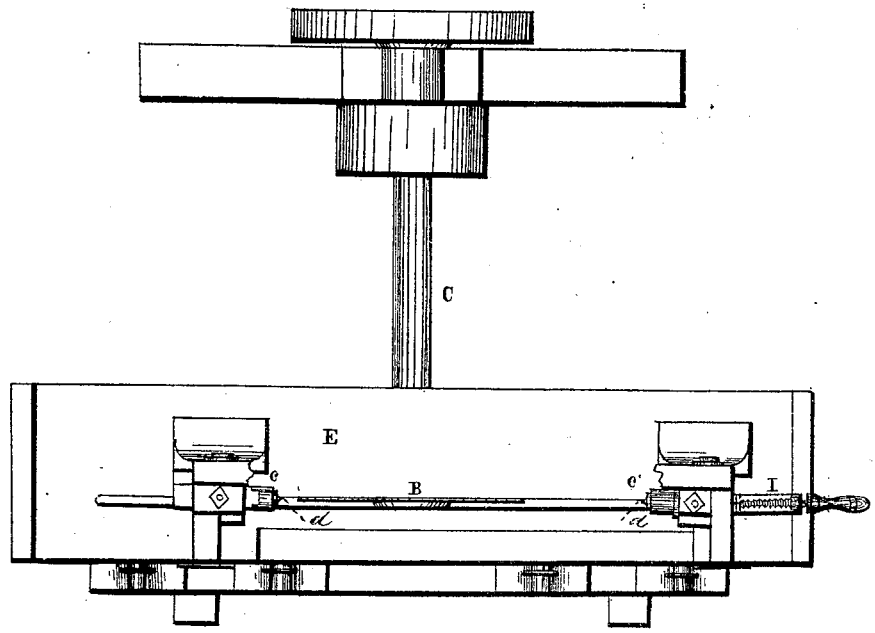
Figure 3:
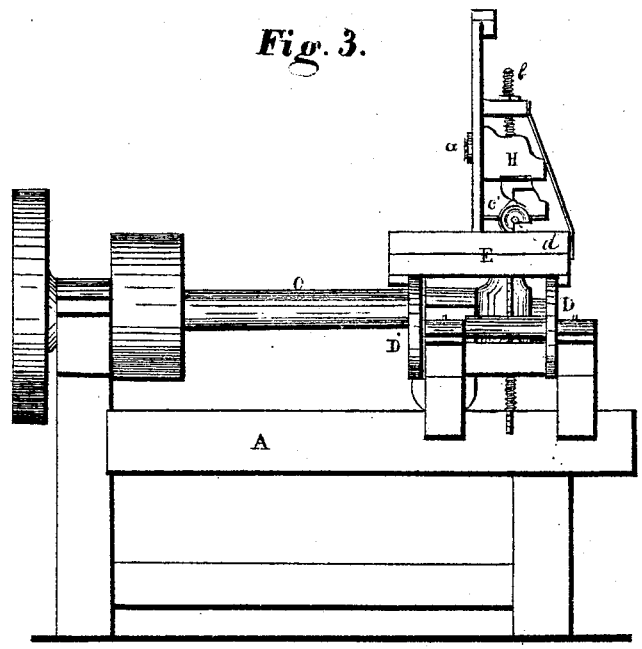
Figure 4:
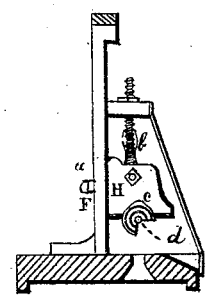

Figure 1 is a side view of the machine. Fig. 2 is a plan view. Fig. 3 is an end view. Fig. 4 is a detached section.

Like letters of reference refer to like parts in the several views.

The object of this invention is to hold spoke-timber or bolts, while being sawn into spokes, by the use of a pair of dogs or centers, which are so made that each piece cut from the bolt secured in the dogs shall be sawn close into the center thereof without the saw interfering with the dogs, thereby allowing each piece cut to fall from the bolt. The invention also consists in the construction and arrangement of the saw frame and carriage in which the saw is hung and the log or bolt fed thereto.

Of the above invention the following is a more full and complete description. A represents the frame in which the saw B is hung on the shaft C, having its bearings in the frame, as shown in the drawing. D, Figs. 1 and 3, is a series of rollers on which the carriage E is mounted and operated in its relation to the saw for holding and feeding the log thereto. F G are standards secured to the carriage. To the side of said standards are attached the head-blocks H, Fig. 3, by means of set-screws $a$ inserted in a slot in the standard, so that said heads can be adjusted in height by means of the adjusting-screws $b$. In said blocks are fitted the centers or dogs $c$ $c'$; the dog $c$ is fixed in the block, whereas the dog $c'$ is movable therein by means of the screw I, whereby the dog is moved backward and forward for dogging the bolt. It will be observed that the dogs referred to have flat or blunt faces, as shown in Fig. 2, with an annular central ring and a point, $d$, both of which slightly project beyond the general surface of the face, the point being the most in advance.

A section of one side of the dog is cut away longitudinally forming an angular notch of about ninety degrees. One limb of the notch holds a vertical relation to the side of the saw, whereas the other limb holds a horizontal transverse relation thereto, as will be seen in Figs. 3 and 4. The purpose of said notch will presently be shown.

The practical operation of the above-described machine and dogging device is as follows: A log or bolt of the length of a spoke is secured in the dogs and which will be held thereby in range with the saw and in front of it, the carriage being moved forward for that purpose. The log will be held in place by the rings on the face of the dogs. The center or point of each dog is adjusted so as to range with the upper edge of the saw. Now, on pushing the carriage forward it will be obvious that the saw will cut into the log close to the center line, as the angular notch in the dogs allows the saw to run close into the dogs or point, but which could not be done were it not for the notch. One cut having been made, the carriage is drawn back; the log is then turned around on its centers or dogs, so far as required for the thickness of a spoke; the carriage is again moved forward and another cut made in the log, which as before is sawn close into the center line or the axial line of the log's rotation, thereby cutting the piece loose from the log, which will drop to the side of the saw onto the carriage, from thence to the floor; again the carriage is drawn back and another turn made of the log, as before, and so on until the log is entirely sawn up.

It will be obvious that the log is not held in position for sawing by the center points of the dogs, as the sawing is done up to a right line therewith; hence they could have no hold in the log as its center is cut away. The log therefore is held by the rings on the face of the dogs and is turned thereon for sawing each successive piece for a spoke. By the use of dogs on centers, made as above described, I am enabled to saw up the entire log from the outside to its center, thereby wasting no timber.

Logs of different sizes can be sawn in this machine by adjusting the dogs in their relation of distance to the edge of the saw, as the size of the log may require. For this purpose the adjusting screws $b$ are used. The frame D′, in which the friction-rollers D have their bearing, is attached to the frame A by means of set-screws indicated by the dotted lines $a^2$, Fig. 1, fitted in slots so that the frame can be easily and readily adjusted in its relation to the saw-carriage, as circumstances may require.

Claims.

What I claim as my invention, and desire to secure by Letters Patent, is—

The dogging-centers $c\ c^t$, as described and arranged in connection with the saw, and in combination with the adjustable head-blocks H and carriage E, substantially as and for the purpose set forth.

JOHNSTON V. WOOLSEY.

Witnesses:
W. H. BURRIDGE,
JULIUS SCHELDT.